(12) United States Patent
Primozich et al.

(10) Patent No.: US 12,423,727 B2
(45) Date of Patent: Sep. 23, 2025

(54) SALES MANAGEMENT SYSTEM, SALES MANAGEMENT METHOD, AND NON-TRANSITORY COMPUTER READABLE STORAGE MEDIUM

(71) Applicant: Rakuten Group, Inc., Tokyo (JP)

(72) Inventors: Neil Primozich, Tokyo (JP); James Camps, Tokyo (JP); Wingin Chau, Tokyo (JP); KahHui How, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 374 days.

(21) Appl. No.: 17/868,194

(22) Filed: Jul. 19, 2022

(65) Prior Publication Data
US 2023/0023177 A1 Jan. 26, 2023

(30) Foreign Application Priority Data
Jul. 20, 2021 (JP) .................. 2021-119806

(51) Int. Cl.
*G06Q 30/00* (2023.01)
*G06Q 30/0242* (2023.01)
*G06Q 30/0601* (2023.01)

(52) U.S. Cl.
CPC ..... *G06Q 30/0242* (2013.01); *G06Q 30/0605* (2013.01); *G06Q 30/0633* (2013.01)

(58) Field of Classification Search
CPC .......... G06Q 30/0242; G06Q 30/0605; G06Q 30/0633
See application file for complete search history.

(56) References Cited

U.S. PATENT DOCUMENTS

| 10,614,485 B1 | 4/2020 | Ford et al. |
| 2014/0222509 A1* | 8/2014 | Kudou .................. G06F 8/38 |
| | | 705/7.31 |

FOREIGN PATENT DOCUMENTS

| JP | 2007-179199 A | 7/2007 |
| JP | 2014-153885 A | 8/2014 |
| JP | 5714037 B2 | 5/2015 |

OTHER PUBLICATIONS

Extended European Search Report dated Nov. 30, 2022, in European Application No. 22185492.0.
Joanie McLaren, "4 Keys to Better Retail Promotion Forecasting and Replenishment", [online], Oct. 22, 2020, [retrieved on Sep. 12, 2022], Retrieved from the Internet: <URL:https://www.relexsolutions.com/resources/4-keys-to-better-retail-promotion-forecasting-and-replenishment/>, (12 pages total).
Communication dated Jan. 24, 2025 in European Application No. 22 185 492.0.

\* cited by examiner

*Primary Examiner* — Anand Loharikar
(74) *Attorney, Agent, or Firm* — Sughrue Mion, PLLC

(57) ABSTRACT

Provided is a sales management system configured to: acquire: sales data on a target product sold at a shop to be targeted, the sales data indicating a plurality of time-series values relating to sales of the target product; and a period of a bargain sale of the target product at the shop to be targeted; and output an image including a graph which is based on the plurality of time-series values indicated by the acquired sales data, and in which a display mode for an area corresponding to the period of the bargain sale is different from a display mode for another area.

10 Claims, 8 Drawing Sheets

FIG.4

SHOP ABC: SALES DATA

| DATE | PRODUCT ID | ACTUAL SALES QUANTITY | PREDICTED SALES QUANTITY | PRICE | COST PRICE | STOCK |
|---|---|---|---|---|---|---|
| 2020/12/28 | 20036 | 3 | 3 | 298 | 159 | 230 |
| 2020/12/29 | 20036 | 0 | 4 | 298 | 159 | 227 |
| 2020/12/30 | 20036 | 4 | 3 | 298 | 159 | 227 |

SHOP ABC: PROMOTION INFORMATION

| PROMOTION ID | TARGET SHOP | NAME | PROMOTION PERIOD | TARGET PRODUCT | TARGET CATEGORY | DISCOUNT RATE | DISCOUNT AMOUNT |
|---|---|---|---|---|---|---|---|
| P2039 | SHOP ABC | NEW YEAR'S SALE AT DAILY FOOD SECTION | JANUARY 5, 2021 TO JANUARY 7, 2021 | | DAILY FOODS | 10% | |
| P1100 | SHOP ABC | 10% DISCOUNT ON COMPANY A PRODUCTS | JANUARY 15, 2021 TO JANUARY 21, 2021 | | COMPANY A | 10% | |
| P0011 | SHOP ABC | UDON NOODLE SOUP B SALE | JANUARY 8, 2021 TO JANUARY 8, 2021 | UDON NOODLE SOUP B | | | 100 YEN |
| ... | | | | | | | |

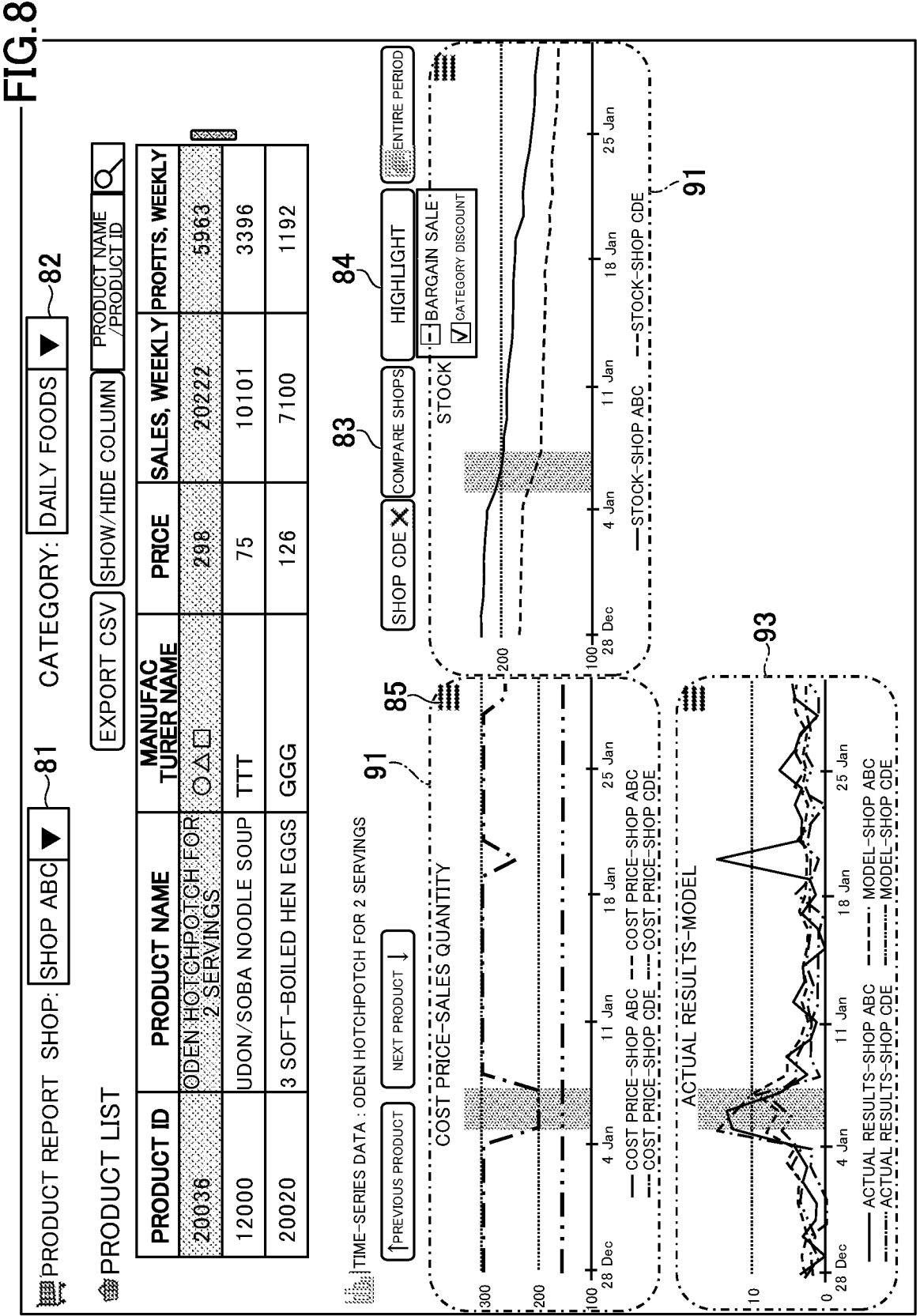

SALES MANAGEMENT SYSTEM, SALES MANAGEMENT METHOD, AND NON-TRANSITORY COMPUTER READABLE STORAGE MEDIUM

CROSS-REFERENCE TO RELATED APPLICATION

The present application claims priority from Japanese application JP 2021-119806 filed on Jul. 20, 2021, the content of which is hereby incorporated by reference into this application.

BACKGROUND OF THE INVENTION

1. Field of the Invention

The present invention relates to a sales management system, a sales management method, and a non-transitory computer readable storage medium.

2. Description of the Related Art

In order to allow performance of a shop to be easily examined, there is provided a sales management system for displaying statistical information relating to sales of products at the shop in time series.

In JP2014-153885A, there is disclosed a system for displaying, in a graph, actual result values and past predicted values of selling prices, numbers of purchased items, sales amounts, and profit amounts in relation to verification of effects of a bargain sale operation.

In JP2007-179199A, it is disclosed to select a shop satisfying a condition selected as a comparison condition (for example, having the closest total sales amount in the last week) and to display sales corresponding to a comparison product regarding an own shop and the selected shop for comparison with each other.

Even when time-series statistical information relating to the sales of a product is displayed, it has been difficult for an administrator viewing the time-series statistical information to determine factors that have caused a sales status of the product. This is because the sales status of a product is influenced also by a factor that rarely appears in statistics.

SUMMARY OF THE INVENTION

The present invention has been made in view of the above-mentioned problem, and has an object to provide a technology that enables more appropriate determination of a factor that causes a sales status of a product.

In order to solve the above-mentioned problem, according to at least one embodiment of the present invention, there is provided a sales management system including: an acquiring means for acquiring: sales data on a target product sold at a shop to be targeted, the sales data indicating a plurality of time-series values relating to sales of the target product; and a period of a bargain sale of the target product at the shop to be targeted; and an output means for outputting an image including a graph which is based on the plurality of time-series values indicated by the acquired sales data, and in which a display mode for an area corresponding to the period of the bargain sale is different from a display mode for another area.

Further, according to at least one embodiment of the present invention, there is provided a sales management method including: acquiring: sales data on a target product sold at a shop to be targeted, the sales data indicating a plurality of time-series values relating to sales of the target product; and a period of a bargain sale of the target product at the shop to be targeted; and outputting an image including a graph which is based on the plurality of time-series values indicated by the acquired sales data, and in which a display mode for an area corresponding to the period of the bargain sale is different from a display mode for another area.

Further, according to at least one embodiment of the present invention, there is provided a program for causing a computer to function as: an acquiring means for acquiring: sales data on a target product sold at a shop to be targeted, the sales data indicating a plurality of time-series values relating to sales of the target product; and a period of a bargain sale of the target product at the shop to be targeted; and an output means for outputting an image including a graph which is based on the plurality of time-series values indicated by the acquired sales data, and in which a display mode for an area corresponding to the period of the bargain sale is different from a display mode for another area.

In one aspect of the present invention, the sales data may indicate a time-series transition of at least one of an actual result value of a sales quantity, a predicted value of the sales quantity, a selling price, or a stock.

In one aspect of the present invention, the output means outputs an image in which the area corresponding to the period of the bargain sale is drawn in a display mode corresponding to an attribute of the bargain sale.

In one aspect of the present invention, the sales management system may further include an advertisement acquiring means for acquiring a strength of an advertisement for the bargain sale, and the output means may output an image in which the area corresponding to the period of the bargain sale is drawn in a display mode corresponding to the strength of the advertisement for the bargain sale.

In one aspect of the present invention, the advertisement acquiring means may acquire, as the strength of the advertisement, a display frequency of a web page on which the advertisement for the bargain sale is displayed.

In one aspect of the present invention, the acquiring means may acquire: the sales data on the target product sold at the shop to be targeted; a period of a product bargain sale set for the target product at the shop; and a period of a category bargain sale set for a category including the target product at the shop, and the output means may output an image including a graph in which a display mode for an area corresponding to the period of one of the product bargain sale and the category bargain sale that has been selected by a user is different from a display mode for the another area.

In one aspect of the present invention, the acquiring means may acquire: sales data on the target product sold at another shop different from the shop to be targeted; and a period of a bargain sale of the target product at the another shop, and the output means may output an image including a graph which is based on the sales data acquired for the shop to be targeted and the another shop, and in which an area corresponding to the period of the bargain sale at the shop to be targeted and an area corresponding to the period of the bargain sale at the another shop are drawn in mutually different display modes.

In one aspect of the present invention, the output means may output an image including a graph in which a display mode regarding a value that is not included in the period of the bargain sale among the plurality of time-series values indicated by the acquired sales data and a display mode regarding a value included in the period of the bargain sale among the plurality of time-series values are different from each other.

In one aspect of the present invention, the output means may output an image including a graph in which the value included in the period of the bargain sale is not drawn.

In one aspect of the present invention, the sales data may indicate a plurality of time-series values each associated with at least one of a date or a time in relation to the sales of the target product.

According to the at least one embodiment of the present invention, the factor that causes the sales status of the product can be determined more appropriately.

BRIEF DESCRIPTION OF THE DRAWINGS

FIG. 4 is a table for showing an example of sales data.

FIG. 5 is a table for showing an example of promotion information.

FIG. 8 is a view for illustrating another example of the report screen.

DETAILED DESCRIPTION OF THE INVENTION

Now, at least one embodiment of the present invention is described with reference to the drawings. Redundant description of configurations denoted by the same reference symbols is omitted. In the at least one embodiment, a sales management system configured to display a sales status for each of a plurality of existing shops is described.

This sales management system assists in determining a price of a product for each of a plurality of shops. The sales management system also transmits the price determined based on the assistance to a shop management system. The shop management system manages POS registers placed in the plurality of shops, and stores sales data on each product in a database for each of the plurality of shops. The sales management system acquires the sales data from a system that manages the POS registers, and displays a report obtained by processing the sales data. Thus, the sales management system assists an administrator in analyzing the sales status and determining the price.

Figure 1:
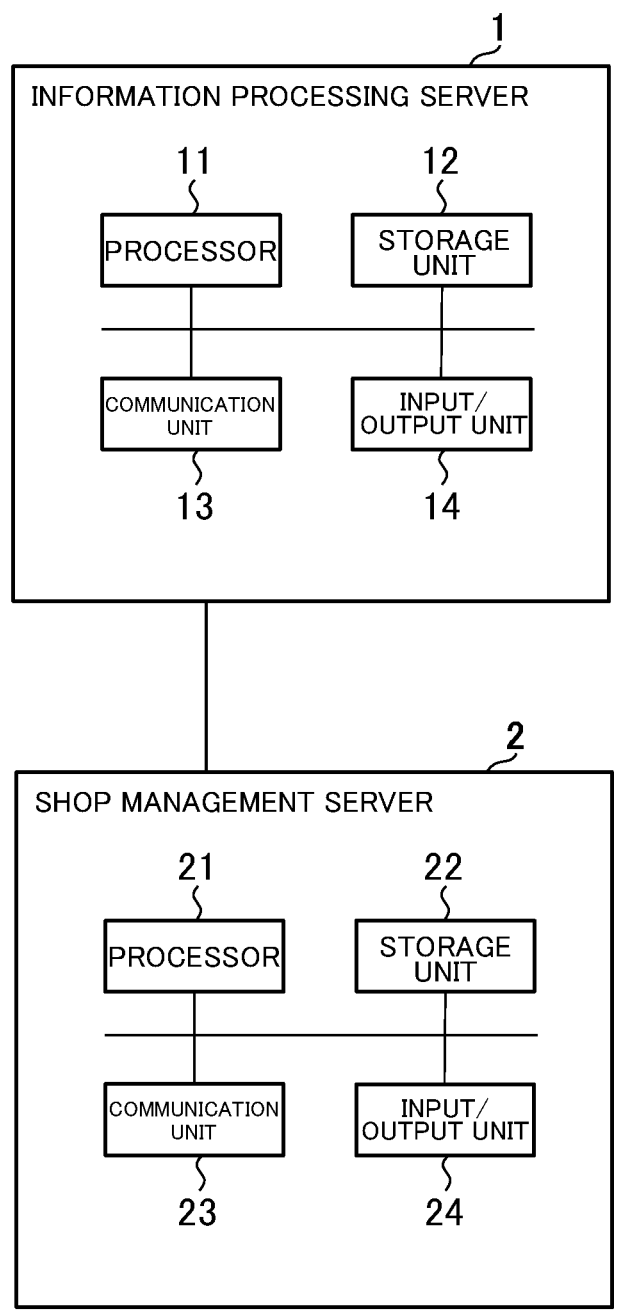
FIG. 1 is a diagram for illustrating an example of a sales management system according to at least one embodiment of the present invention.

FIG. 1 is a diagram for illustrating an example of the sales management system according to the at least one embodiment of the present invention. The sales management system includes an information processing server 1. The information processing server 1 is connected to a shop management server 2 through a network. The shop management server 2 forms the system that manages POS registers. Each of the information processing server and the shop management server 2 may be a single server computer. Each of those may instead be formed of a plurality of server computers. In another case, the shop management server 2 may be incorporated in the sales management system.

The information processing server 1 includes a processor 11, a storage unit 12, a communication unit 13, and an input/output unit 14. Processing of the information processing server 1 may be implemented by a plurality of server computers. The shop management server 2 includes a processor 21, a storage unit 22, a communication unit 23, and an input/output unit 24.

The processors 11 and 21 operate in accordance with programs stored in the storage units 12 and 22, respectively. Further, the processors 11 and 21 control the communication units 13 and 23 and the input/output units 14 and 24, respectively. The above-mentioned programs may be provided through, for example, the Internet, or may be provided by being stored and provided in a flash memory, a DVD-ROM, or another computer-readable storage medium.

The storage units 12 and 22 are each formed of memory devices, such as a RAM and a flash memory, and an external storage device, such as a hard disk drive. The storage units 12 and 22 store the above-mentioned programs. The storage units 12 and 22 also store information and calculation results that are input from the processors 11 and 21, the communication units 13 and 23, and the input/output units 14 and 24, respectively.

The communication units 13 and 23 each implement a function of communicating to/from another device, and are each formed of, for example, an integrated circuit for implementing a wireless LAN or a wired LAN. Under control of the processors 11 and 21, the communication units 13 and 23 input information received from another device to the processors 11 and 21 and the storage units 12 and 22, respectively, and transmit information to another device.

The input/output units 14 and 24 are each formed of, for example, a video controller for controlling a display output device and a controller for acquiring data from an input device. Examples of the input device include a keyboard, a mouse, and a touch panel. The input/output units 14 and 24 output display data to the display output device under the control of the processors 11 and 21, respectively, and acquire data input by a user operating the input device. The display output device is, for example, a display device connected to the outside.

Figure 2:
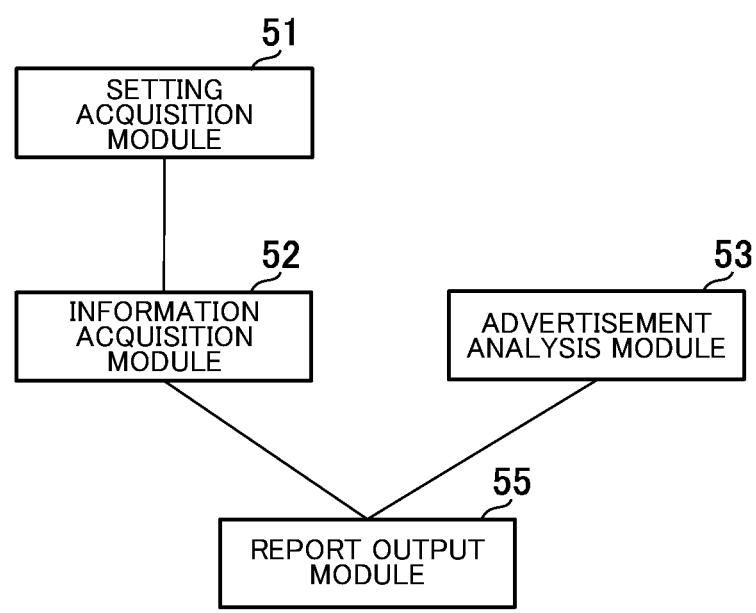
FIG. 2 is a block diagram for illustrating functions implemented by the sales management system.

Now, functions provided by the sales management system are described. FIG. 2 is a block diagram for illustrating the functions implemented by the sales management system. The sales management system functionally includes a setting acquisition module 51, an information acquisition module 52, an advertisement analysis module 53, and a report output module 55. Those functions are implemented mainly by the processor 11, which is included in the information processing server 1, executing programs stored in the storage unit 12 to control the communication unit 13 and the like. In this case, a part of the function of the report output module 55 may be implemented by the processor 21, which is included in the shop management server 2, executing a program stored in the storage unit 22 to control the communication unit 23 and the input/output unit 24.

The setting acquisition module 51 acquires a shop (target shop) to be targeted for output of a report and a product (target product) to be targeted therefor. The setting acquisition module 51 also acquires, as settings of the report, a type of promotion to be displayed, items (display items) of sales data to be displayed, and a comparison shop being another shop to be compared. In this case, only when the administrator explicitly sets a comparison shop, the setting acquisition module 51 may acquire the comparison shop. In addition, the setting acquisition module 51 may acquire colors and densities to be used at a time of outputting each piece of data and a promotion period for a graph to be displayed as the report when the colors and densities are explicitly input by the administrator.

The information acquisition module 52 acquires the sales data on the target product sold at the shop to be targeted and the promotion period of the target product at the target shop. The sales data indicates a plurality of time-series values each associated with at least one of a date or a time in relation to the sales of the target product.

The sales data is data indicating a plurality of time-series values regarding at least one of an actual result value of a sales quantity, a predicted value of a sales quantity, a selling price, or a stock. Each of the plurality of values included in the sales data may be associated with a date and a time, may be associated with only a date, or may be associated with only a time. The promotion is also called "bargain sale," and often refers to offering a price discount by rate or amount for a limited time. The promotion also involves an advertisement relating to the promotion using a notice at a shop and leaflets. Thus, customers of the shop recognize that the promotion is available, and are likely to be willing to make a purchase.

The advertisement analysis module 53 acquires a strength of an advertisement for a promotion. More specifically, the advertisement analysis module 53 acquires, as the strength of the advertisement for the promotion, a display frequency of a web page on which the advertisement for the promotion is displayed. The display frequency may be the number of impressions during a fixed period. The display frequency may be a value obtained by dividing the number of impressions by a period during which the advertisement is output.

The report output module 55 outputs an image of a report including a graph based on the plurality of time-series values and the date or time associated with the plurality of values. The plurality of time-series values are indicated by the acquired sales data. The report output module 55 outputs the image of the report so that, in the graph, a display mode for an area corresponding to the promotion period is different from that of another area. The report output module 55 further outputs an image including the graph in which the area corresponding to the promotion period is drawn in a display mode corresponding to an attribute of the promotion (for example, strength of the advertisement).

Figure 3:
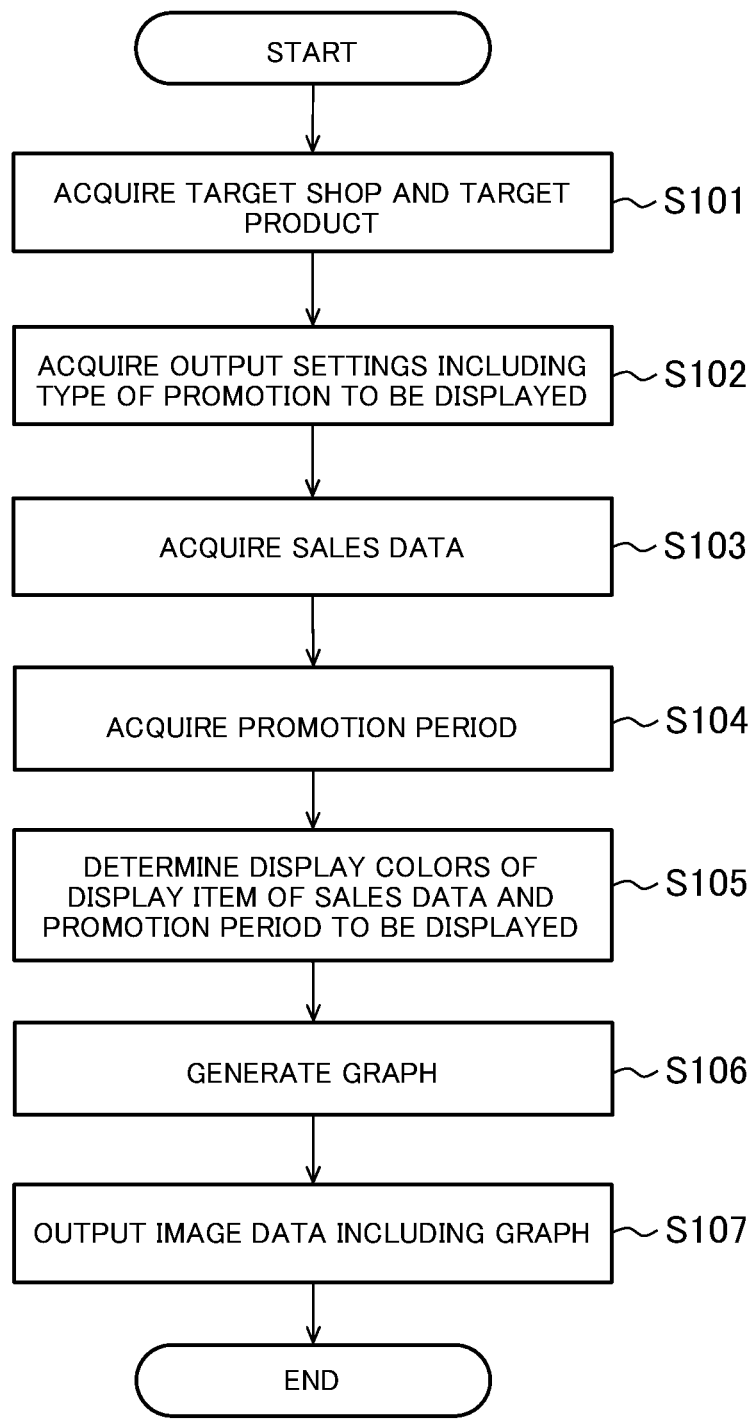
FIG. 3 is a flow chart for schematically illustrating processing of the sales management system.

Next, details of processing of the sales management system are described along with details of the respective functions. FIG. 3 is a flow chart for schematically illustrating the processing of the sales management system. The processing illustrated in FIG. 3 is executed mainly by the processor 11 included in the information processing server 1 based on the program stored in the storage unit 12. The processing illustrated in FIG. 3 is processing to be performed when one report screen regarding a certain target shop and target product is output. This processing is executed every time the setting is changed by the administrator.

First, the setting acquisition module 51 acquires the target shop and the target product that are input from the administrator (Step S101). When the report screen is output for the first time, the setting acquisition module 51 may acquire default values as output settings. In this case, a default target shop may be a shop at the head of a shop master, and a default target product may be a product exhibiting the largest sales quantity at the shop.

The setting acquisition module 51 further acquires output settings including the type of promotion to be displayed (Step S102). The output settings may include the number of graphs to be included in the image to be output, the display items of the sales data to be drawn on each of the graphs, and the comparison shop being the shop to be compared.

When the target shop and the target product are acquired, the information acquisition module 52 acquires the sales data (Step S103). In this case, the shop management server 2 generates in advance the sales data based on actual sales results (for example, actual result value of the sales quantity, price, and stock) acquired from the POS register and the information (for example, price) stored in the storage unit 22. Then, the generated sales data is stored in the database on the shop management server 2 side. The information acquisition module 52 further receives in advance the sales data from the shop management server 2 and stores the sales data in the storage unit 12. At this time, the shop management server 2 is not required to include the predicted value of the sales quantity. In this case, the information acquisition module 52 of the information processing server 1 calculates the predicted value of the sales quantity for each date based on price elasticity (also referred to as "price sensitivity") obtained from the past sales data on the product, and stores the predicted value in the storage unit 12 in association with the date or time.

The price elasticity is an indicator indicating how much influence is exerted on at least one of a sale (sales quantity) or a profit by the price fluctuation of the product. A method of calculating the price elasticity is publicly known, and is described in, for example, JP2020-177350A. The price elasticity can be obtained by normalizing a correlation coefficient between the price fluctuation of the product and the sales quantity of the product. The information acquisition module 52 may obtain the predicted value of the sales quantity by, for example, multiplying the past actual result value by a coefficient based on the price fluctuation and the price elasticity.

In Step S103, the information acquisition module 52 acquires sales data regarding the target shop and the target product from the sales data stored in the storage unit 12. In Step S103, the information acquisition module 52 may transmit, to the shop management server 2, information for requesting the shop management server 2 for the sales data together with the target shop and product, and receive the sales data regarding the target shop and the target product from the shop management server 2.

FIG. 4 is a table for showing an example of the sales data. The sales data shown in FIG. 4 includes, for a certain shop, a plurality of records each including a date, a product ID, an actual sales quantity, a predicted sales quantity, a price, a cost price, and a stock. The plurality of records each include the item of a date, and hence each of the actual sales quantity, the predicted sales quantity, the price, the cost price, and the stock is stored in the storage unit 12 in association with the date or time. The product ID is an ID identifying the product, and in the sales data shown in FIG. 4, the product ID of the target product is set as the product ID of every record.

Subsequently, the information acquisition module 52 acquires promotion information including the promotion period (Step S104). The promotion information is generated by the shop management server 2, and the information acquisition module 52 receives in advance the promotion information from the shop management server 2, and stores the promotion information in the storage unit 12. In Step S104, the information acquisition module 52 acquires promotion information to be applied to the target shop and the target product from the promotion information stored in the storage unit 12.

FIG. 5 is a table for showing an example of the promotion information. The promotion information shown in FIG. 5 is stored in the storage unit 12. The promotion information includes a promotion ID, a name of a promotion, a promotion period, a product or category to be targeted, and a discount amount or discount rate. FIG. 5 shows only promotions for a shop ABC being the target shop, but the storage unit 12 actually stores the promotion information regarding other shops.

In Step S104, the information acquisition module 52 acquires promotion information satisfying an acquisition condition from the storage unit 12 for the target shop. The acquisition condition is that the target product of the promotion information includes the acquired target product or that the acquired target product is included in the target category of the promotion information.

When the sales data and the promotion period are acquired, the report output module 55 determines the display colors of the display item of the sales data and the promotion period to be displayed (Step S105).

Figure 6:
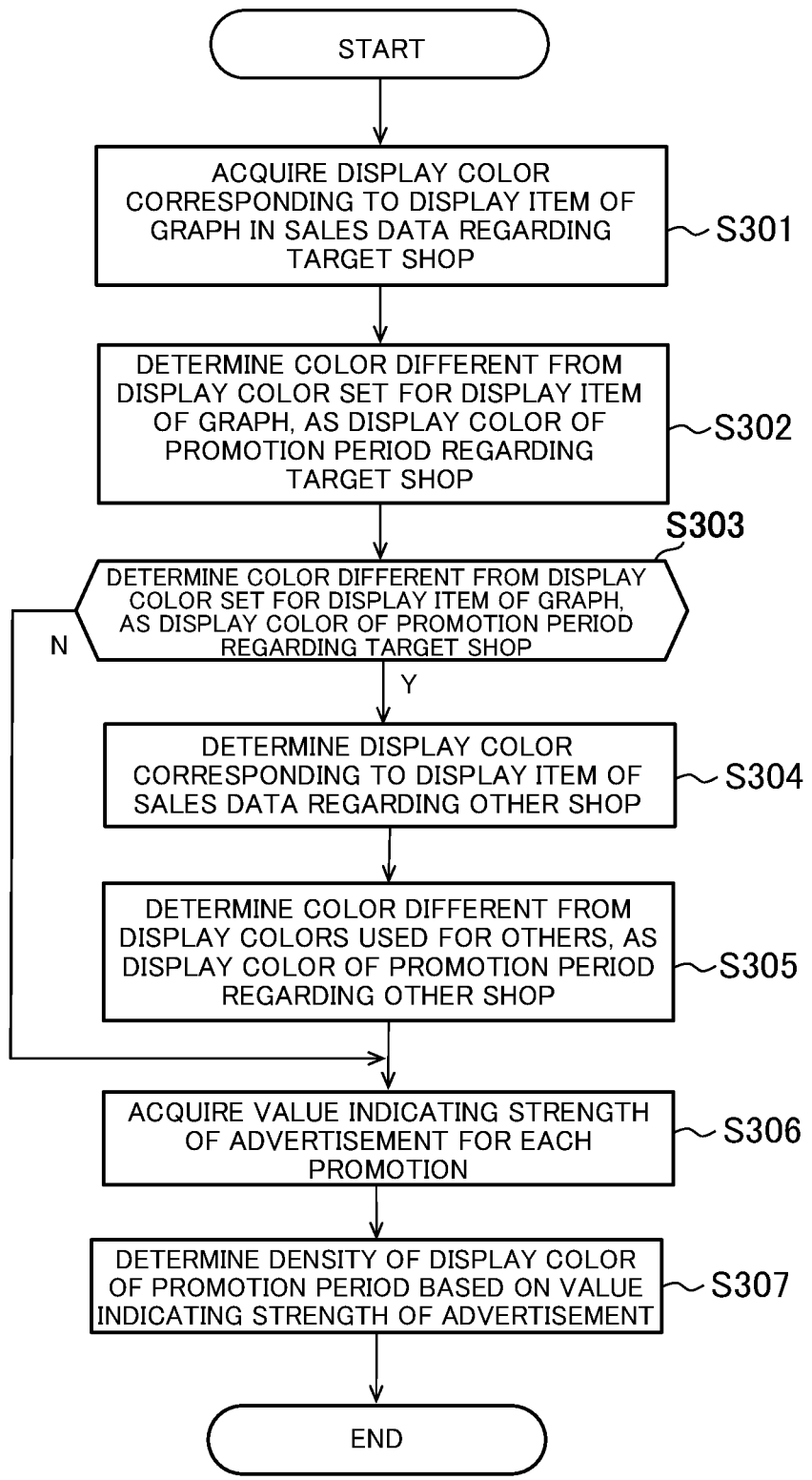
FIG. 6 is a flow chart for illustrating an example of processing for determining display colors.

The processing step of Step S105 is described in more detail. FIG. 6 is a flow chart for illustrating an example of processing for determining the display colors. The processing illustrated in FIG. 6 is executed for each of the graphs included in the report. On one graph, one display item (for example, stock) of the sales data may be drawn, or a plurality of display items (for example, price and cost price, or actual sales quantity and predicted sales quantity) may be drawn.

First, the report output module 55 acquires a display color corresponding to the display item of the graph in the sales data regarding the target shop (Step S301). In this processing, the report output module 55 may acquire the display color corresponding to the display item from, for example, a display color list including a plurality of display colors. In this case, when a plurality of display items are present for the graph, the report output module 55 acquires mutually different display colors from the display color list for each of the display items.

Subsequently, the report output module 55 determines a color different from the display color which is set for the display item of the graph, as the display color of the promotion period regarding the target shop (Step S302). The report output module 55 may acquire a display color different from the display color corresponding to the display item from, for example, the display color list as the display color of the promotion period.

In addition, when another shop to be compared is designated ("Y" in Step S303), the report output module 55 determines a display color different from the display colors acquired for the display item and the promotion period for the target shop, as the display color corresponding to the display item of the graph in the sales data regarding the other shop (Step S304). The report output module 55 also determines a color different from the display colors acquired or determined in Step S301, Step S302, and Step S304, as the display color of the promotion period regarding the promotion period of the other shop (Step S305). When another shop to be compared is not designated ("N" in Step S303), Step S304 and Step S305 are skipped.

Then, the advertisement analysis module 53 acquires a value indicating the strength of an advertisement for each promotion relating to the target shop and the other shop (Step S306). More specifically, the advertisement analysis module 53 acquires an access log or access statistics from a server that outputs an advertisement web page for each of the plurality of shops. Then, the advertisement analysis module 53 acquires, as the strength of the advertisement for the promotion, the display frequency or the number of impressions of a web page including an image of the promotion from the access log or the access statistics.

Instead of the strength of the advertisement, the advertisement analysis module 53 may acquire a value obtained by inputting the number of products to be targeted for the promotion into a monotonically decreasing function, or the discount rate for the promotion. The number of products targeted for the promotion, the discount rate, and the strength of the advertisement are kinds of attributes of the promotion. For example, when the number of products targeted for the promotion is small, the discount is more noticeable than other products, and hence a probability that the promotion exerts a large influence on customers is high. When the discount rate is high, a probability that the promotion exerts a large influence on customers is high as well. Accordingly, when a more noticeable color is used for the drawing for the promotion exerting a larger influence, it becomes easier for the administrator visually recognizing the color to grasp a state more intuitively.

The report output module 55 determines the density of the display color of the promotion period based on the acquired value indicating the strength of the advertisement (Step S307). For example, the report output module 55 may determine a display color that is darker as the strength of the advertisement is stronger. The display color of the promotion period determined in Step S302 and Step S305 may have a hue of the display color of the promotion period. In addition, the display color (including the hue) of the promotion period may be determined based on the value indicating the strength of the advertisement. In this case, the report output module 55 may determine, as the display color, a color that is less noticeable as the strength of the advertisement is weaker.

When the display colors of the display item of the sales data and the promotion period are determined, the report output module 55 generates a graph in which the display item and the promotion period are drawn (Step S106). More specifically, the report output module 55 generates a graph corresponding to the plurality of time-series values for the display item. In this graph, one axis (for example, x-axis) represents the date or time, and the other axis (for example, y-axis) represents the value for the display item of the sales data. The format of the graph may be a line graph or a bar graph. The processing step of Step S106 is executed for each of the graphs for which the output settings have been performed in advance.

The report output module 55 draws, on the graph of the display item, the area corresponding to the promotion period of the promotion of which the type is to be displayed. The promotion is one of the promotions for the shop and the product to be targeted for the sales data to be displayed on the graph. The drawing of this area may refer to filling a background of a portion of the date or time corresponding to the promotion period with the determined display color. In another case, a partial image may be drawn in another display mode for the portion corresponding to the promotion period on the time axis.

When one or a plurality of graphs are generated, the report output module 55 outputs image data including those graphs (Step S107). This output may refer to transmitting image data such as HTML data to the shop management server 2 or another computer being operated by the administrator, or may simply refer to transmitting image data for displaying the image to the display output device.

Figure 7:
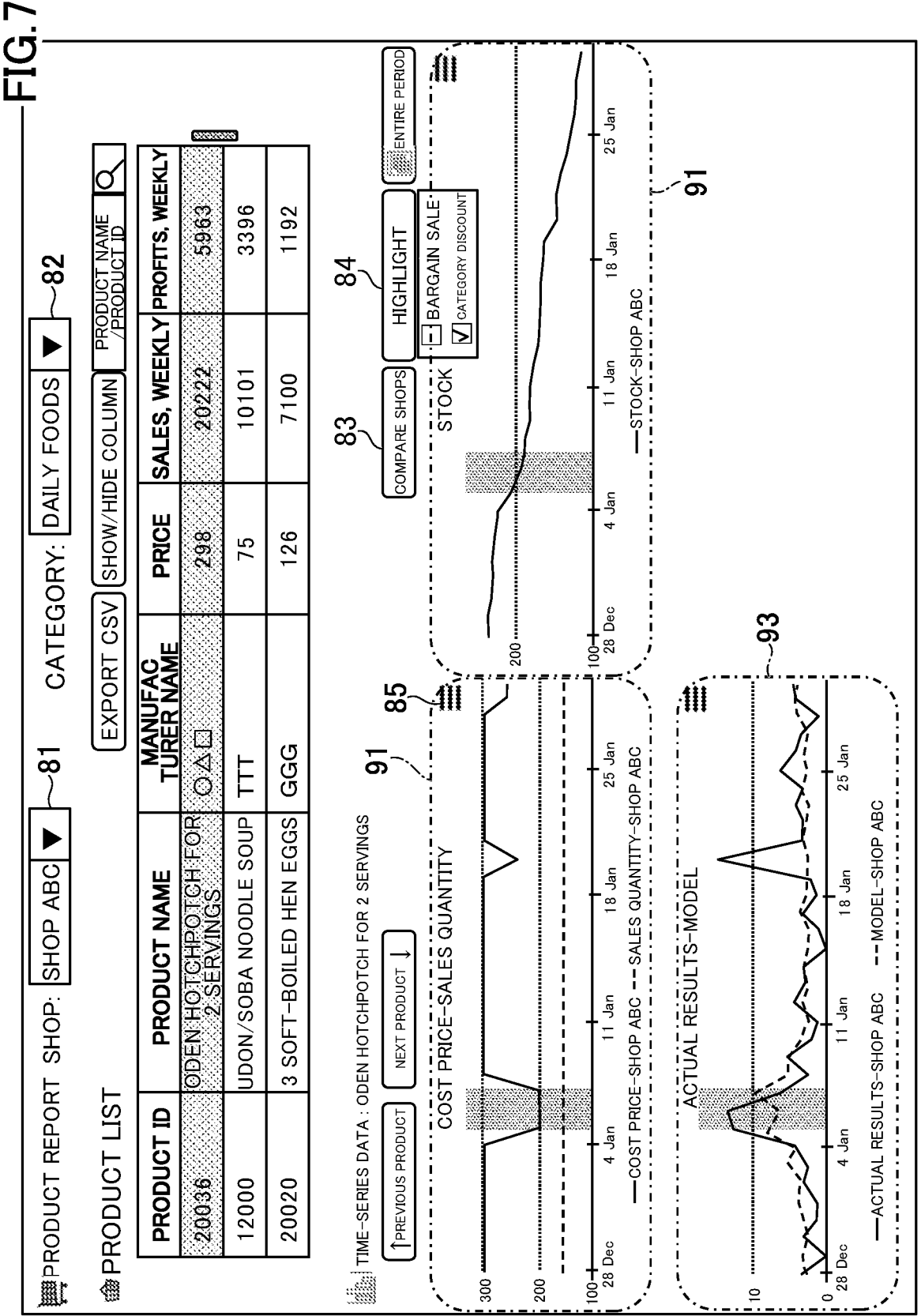
FIG. 7 is a view for illustrating an example of a report screen.

FIG. 7 is a view for illustrating an example of the report screen. The report screen illustrated in FIG. 7 also serves as a screen for inputting the target shop, the target product, and the output settings. The report screen includes a shop selection field 81 for inputting the target shop, a category selection field 82 for selecting a product category, a shop comparison button 83, a promotion selection button 84, a product list, a price graph 91, a stock graph 92, and a sales quantity graph 93. The report screen illustrated in FIG. 7 is an example of display performed when the comparison shop is not set.

The promotion selection button 84 is a button for setting the type of promotion to be displayed. When the promotion selection button 84 is pressed, a pull-down menu for selecting which one of the types of promotion is to be displayed is displayed. In this case, the types of promotions available as selection targets include a promotion being a bargain sale of only a product and a promotion targeting a discount for each product category. When the type of promotion to be displayed is input, the output settings including the type of promotion are transmitted from the computer being operated by the administrator to the information processing server 1, and the report screen is redrawn.

The product list is a list of products included in the category selected in the category selection field 82. In the product list, for each of the products, the attributes of the product and statistical values relating to the product, such as a product ID, a manufacturer name, a price, weekly sales, and weekly profits, are displayed.

The price graph 91, the stock graph 92, and the sales quantity graph 93 are graphs generated in Step S106. In FIG. 7, for the sake of convenience of description, the graphs in which the display items and the type of promotion are distinguished by the modes of lines and fill patterns for the display items of the sales data are shown, but it is to be understood that graphs in which those are distinguished by colors may be generated. In this case, when a setting button 85 at the upper right of each graph is pressed, it is possible to perform detailed settings, for example, to directly set the colors of the display items of the sales data and the promotion period.

In the price graph 91, time-series transitions of the price and the cost price are displayed. In addition, the promotion period is shaded in FIG. 7. The same applies to the other graphs of FIG. 7. It can be understood that, during the promotion period, the cost price does not change while the price is low, and hence a gross profit per product is low. The stock graph 92 is a diagram for illustrating a transition of the stock at the target shop. In a case in which the stock is not replenished, the stock decreases faster as the sales quantity increases.

In the sales quantity graph 93, transitions of the actual result of the sales quantity at the target shop and the predicted value of the sales quantity are displayed. Thus, it appears that a relationship between the price and the sales quantity is large due to an increase in the sales quantity during the promotion period. Meanwhile, deviations from the predicted values calculated from the price elasticity are also large. This enables the administrator to intuitively recognize whether or not it is possible to grasp a relationship between the price and the fluctuation of the sales quantity during the promotion period, and to more reliably recognize factors that have caused the fluctuation of the sales quantity. This can also assist the administrator in determining the selling price of the product more precisely.

The shop comparison button 83 is a button for selecting whether to perform comparison with another shop. When the administrator presses the shop comparison button 83, a screen for selecting the comparison shop is displayed. When the comparison shop to be compared is selected on the displayed screen, the output settings are transmitted from the computer being operated by the administrator to the information processing server 1. Then, the report output module 55 draws the report screen including a graph in which the display items of the sales data and the promotion period are drawn for the comparison shop as well.

FIG. 8 is a view for illustrating another example of the report screen. In FIG. 8, the comparison shop to be compared is displayed next to the shop comparison button 83. In addition, in FIG. 8, a graph of the display items of the sales data regarding the target shop and the comparison shop is drawn on each of the price graph 91, the stock graph 92, and the sales quantity graph 93. In FIG. 8 as well, for the sake of convenience of description, graphs in which the shops, the display items, and the type of promotion are distinguished by the modes of lines and fill patterns for the display items of the sales data are shown. It is to be understood that those may be distinguished by colors.

As illustrated in FIG. 7 and FIG. 8, the graphs generated in Step S106 are also drawn in mutually different display modes between the display items, between the display items and the promotion period, and between the target shop and the comparison shop based on the determination of the display colors, which is illustrated in FIG. 6. This facilitates the grasping of those values. In addition, the areas corresponding to the promotion period are drawn in the display mode corresponding to the attribute of the promotion (for example, strength of the advertisement). This enables the administrator to easily grasp the promotion having a high probability that the promotion exerts a large influence on the actual sales results and the like and to more easily analyze the sales status of the product.

In this case, a method of displaying the graphs by the report output module 55 is not limited to the above-mentioned method. For example, the report output module 55 may cause the display mode to differ depending on the period including the date or time associated with the plurality of time-series values regarding the display item of the sales data. A display mode for the graph of the values associated with the date or time that is not included in the promotion period and a display mode for the graph of the values associated with the date or time included in the promotion period may be caused to differ from each other. For example, the report output module 55 may cause the display mode for the graph of the values associated with the date or time included in the promotion period to become less noticeable than the display mode for the graph of the values associated with the date or time that is not included in the promotion period. Further, the values associated with the date or time included in the promotion period are not required to be drawn in the graph. Accordingly, a promotion period during which unexpected fluctuation is liable to occur can be excluded at the time of comparison between a plurality of shops, and it becomes easier for the administrator to intuitively and more accurately analyze factors that have caused the sales status at a plurality of shops.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A sales management system, comprising:
at least one processor; and
at least one memory device that stores a computer program to be executed by the at least one processor, the computer program comprising:
acquisition code configured to cause the at least one processor to acquire sales data on a target product sold at a shop to be targeted, the sales data indicating a plurality of time-series values relating to sales of the target product; and a period of a bargain sale of the target product at the shop to be targeted;
strength acquisition code configured to cause the at least one processor to acquire, as a strength of an advertisement, from an access log or access statistics from a server that outputs an advertisement web page for each of a plurality of shops, a display frequency or a number of impressions of a web page on which an advertisement for the bargain sale is displayed;
color determination code configured to cause the at least one processor to determine a density of a display color in the period of the bargain sale based on the display frequency; and
output code configured to cause the at least one processor to output an image including a graph which is based on the plurality of time-series values indicated by the acquired sales data, and in which a display mode for an area corresponding to the period of the bargain sale is different from a display mode for another area, and in which the area corresponding to the period of the bargain sale is drawn based on the determined density.

2. The sales management system according to claim 1, wherein the sales data indicates a time-series transition of at least one of an actual result value of a sales quantity, a predicted value of the sales quantity, a selling price, or a stock.

3. The sales management system according to claim 1, wherein the computer program causes the at least one processor to output an image in which the area corresponding to the period of the bargain sale is drawn in a display mode corresponding to an attribute of the bargain sale.

4. The sales management system according to claim 1, wherein the computer program causes the at least one processor to: acquire the sales data on the target product sold at the shop to be targeted; a period of a product bargain sale set for the target product at the shop; and a period of a category bargain sale set for a category including the target product at the shop; and
output an image including a graph in which a display mode for an area corresponding to the period of one of the product bargain sale and the category bargain sale that has been selected by a user is different from a display mode for the another area.

5. The sales management system according to claim 1, wherein the computer program causes the at least one processor to: acquire sales data on the target product sold at another shop different from the shop to be targeted; and a period of a bargain sale of the target product at the another shop; and
output an image including a graph which is based on the sales data acquired for the shop to be targeted and the another shop, and in which an area corresponding to the period of the bargain sale at the shop to be targeted and an area corresponding to the period of the bargain sale at the another shop are drawn in mutually different display modes.

6. The sales management system according to claim 1, wherein the computer program causes the at least one processor to output an image including a graph in which a display mode regarding a value that is not included in the period of the bargain sale among the plurality of time-series values indicated by the acquired sales data and a display mode regarding a value included in the period of the bargain sale among the plurality of time-series values are different from each other.

7. The sales management system according to claim 6, wherein the computer program causes the at least one processor to output an image including a graph in which the value included in the period of the bargain sale is not drawn.

8. The sales management system according to claim 1, wherein the sales data indicates a plurality of time-series values each associated with at least one of a date or a time in relation to the sales of the target product.

9. A sales management method, comprising:
acquiring sales data on a target product sold at a shop to be targeted, the sales data indicating a plurality of time-series values relating to sales of the target product; and a period of a bargain sale of the target product at the shop to be targeted with at least one processor operating with a memory device in a system;
acquiring, as a strength of an advertisement, from an access log or access statistics from a server that outputs an advertisement web page for each of a plurality of shops, a display frequency or a number of impressions of a web page on which an advertisement for the bargain sale is displayed;
determining a density of a display color in the period of the bargain sale based on the display frequency; and
outputting, with the at least one processor operating with the memory device in the system, an image including a graph which is based on the plurality of time-series values indicated by the acquired sales data, and in which a display mode for an area corresponding to the period of the bargain sale is different from a display mode for another area, and in which the area corresponding to the period of the bargain sale is drawn based on the determined density.

10. A non-transitory computer readable storage medium storing a computer program, wherein when executed by at least one processor, the computer program comprising:
acquisition code configured to cause the at least one processor to acquire sales data on a target product sold at a shop to be targeted, the sales data indicating a plurality of time-series values relating to sales of the target product; and a period of a bargain sale of the target product at the shop to be targeted;
strength acquisition code configured to cause the at least one processor to acquire, as a strength of an advertisement, from an access log or access statistics from a server that outputs an advertisement web page for each of a plurality of shops, a display frequency or a number of impressions of a web page on which an advertisement for the bargain sale is displayed;
color determination code configured to cause the at least one processor to determine a density of a display color in the period of the bargain sale based on the display frequency; and output code configured to cause the at least one processor to output an image including a graph which is based on the plurality of time-series values indicated by the acquired sales data, and in which a display mode for an area corresponding to the period of the bargain sale is different from a display mode for another area, and in which the area corresponding to the period of the bargain sale is drawn based on the determined density.

* * * * *